United States Patent [19]

Hardin, Jr.

[11] Patent Number: 4,649,016

[45] Date of Patent: Mar. 10, 1987

[54] REMOTELY OPERABLE FUEL TRANSFER SYSTEM FOR NUCLEAR REACTOR

[75] Inventor: Roy T. Hardin, Jr., Unity Township, Westmoreland County, Pa.

[73] Assignee: Westinghouse Electric Corp., Pittsburgh, Pa.

[21] Appl. No.: 785,814

[22] Filed: Oct. 9, 1985

[51] Int. Cl.$^4$ .................... G21C 19/20; G21C 19/18; E05F 11/00

[52] U.S. Cl. .................................. 376/261; 74/89.15; 49/199; 403/11; 403/356; 414/146

[58] Field of Search ............... 376/269, 270, 268, 264, 376/261, 262; 74/89.15, 424.8 R; 49/199, 200, 362; 403/356, 11, 12, 118, 361; 414/146, 154, 158, 217

[56] References Cited

U.S. PATENT DOCUMENTS

| | | | |
|---|---|---|---|
| 2,893,769 | 7/1959 | Deliso | 403/361 |
| 3,020,225 | 2/1962 | Wootton | 376/269 |
| 3,196,082 | 7/1965 | Lemesle et al. | 376/269 |
| 3,485,520 | 12/1969 | Alexander | 403/361 |
| 3,918,201 | 11/1975 | Graziano | 49/362 |
| 3,940,577 | 2/1976 | Christofer | 414/146 |
| 4,241,540 | 12/1980 | Depperman | 49/199 |
| 4,352,585 | 10/1982 | Spalding | 49/199 |
| 4,362,412 | 12/1982 | Kunz | 403/361 |
| 4,577,483 | 3/1986 | Rehag et al. | 74/89.15 |

Primary Examiner—Deborah L. Kyle
Assistant Examiner—Dan Wasil
Attorney, Agent, or Firm—Daniel C. Abeles

[57] ABSTRACT

A fuel transfer system for transferring fuel assemblies through a transfer tube between fuel exchange locations respectively in a fuel storage and handling building and a containment structure of a nuclear reactor includes a segmented track comprising first, second and third track segments and a segmented drive screw comprising first, second and third drive screw segments respectively associated with the fuel storage and handling building, the transfer tube, and the containment structure. Gaps between the successive, corresponding track segments and drive screw segments permit operation of valves for closing the ends of the transfer tube during normal operation of the reactor, which valves are then opened during fuel exchange operations. The adjacent but normally displaced ends of the first and second and of the second and third drive screw segments include respective, mating engagement means. Remotely operable means advance the first drive screw segment while rotating same to interengage same with the mating engagement means of the adjacent second drive screw segment and then simultaneously advance and rotate both thereof to engage the latter with the third drive screw segment and thereby interengage all three drive screw segments for common rotation. A fuel assembly transfer car carrying a fuel container is supported on the segmented track and selectively driven, through a split ring received on the segmented drive screw in accordance with the direction of rotation thereof, between the exchange locations. The container is pivotally mounted on the car and engages an upending mechanism at each of the fuel exchange locations, which automatically pivots the container from a horizontal position in passage from the transfer tube to a vertical position in the exchange locations, therein or having removed therefrom a fuel rod assembly, and which automatically pivots the container to a horizontal position as the car travels from the exchange location and through the transfer tube to the other exchange location.

17 Claims, 6 Drawing Figures

REMOTELY OPERABLE FUEL TRANSFER SYSTEM FOR NUCLEAR REACTOR

BACKGROUND OF THE INVENTION

1. Field of the Invention

This invention relates to a fuel transfer system for a nuclear reactor and, more particularly, to a remotely operable fuel transfer system for transporting nuclear fuel assemblies between containment for a nuclear reactor and the fuel storage and handling building, when performing fuel loading or unloading operations.

2. Description of the Prior Art

As is well known in the prior art, nuclear reactor systems require periodic refueling, including particularly the exchange of fuel assemblies between the reactor and a fuel storage and handling building, both for removing spent fuel from the reactor and transporting same to the storage and handling building for subsequent inspection, reuse or disposal, and for supplying fresh fuel assemblies from the storage and handling building to the reactor. These fuel exchange operations are performed remotely under controlled conditions requiring adequate isolation of the reactor and its associated containment structure and the fuel storage and handling building.

FIG. 1 illustrates in simplified, schematic form, a typical nuclear reactor power system including a nuclear reactor vessel 10 supported within a containment structure 12. Typically, the walls of the containment structure are formed of reinforced concrete with suitable shielding. The top enclosure 11 of the reactor vessel 10 is capable of being opened through suitable remote means, to expose the interior of the reactor vessel 10 and particularly the fuel assemblies therein. A refueling machine 14 is mounted to travel on a suitable track 16 and includes a mast 18 which is capable of being positioned to extend into the interior of the reactor vessel 10, either to position a new fuel assembly therein or to remove a spent fuel assembly therefrom, and correspondingly to transport new fuel from, or transport spent fuel to, a fuel exchange location 20 within the containment structure 12. A fuel storage and handling building 22 serves both as a storage and handling facility for fresh fuel and a repository for receiving spent fuel. The fuel assemblies being exchanged are transported within the building 22 by a fuel handling machine 24 having a special tooling 26 for grasping the fuel assembly undergoing the exchange operation. The fuel assemblies, whether fresh or spent, are stored in appropriate locations within what is typically termed a fuel pit 28, schematically indicated to be included within the fuel storage and handling building 22 and separated from the exchange location 23 by a partition 29, access therebetween being afforded by a passageway 29a in the partition 29.

A transfer tube 30 connects the containment structure 12 and the fuel storage and handling building 22, extending from a position within the fuel exchange location 20 of the containment structure 12 to a position within a fuel exchange location 23 of the fuel storage and handling building 22. Openings 31 and 32 at the ends of the transfer tube 30 are closed during reactor operation and are open during fuel exchange operations to permit passage of fuel through the transfer tube 30. During the fuel exchange operations, boron-charged water is filled to a standing level, or head, of from 30 to 40 feet in both the containment structure 12 and the fuel storage and handling building 22, to control radiation levels and to protect workmen who are involved in the fuel exchange operations from exposure to such radiation.

The path through which the fuel assemblies are moved during such refueling, or fuel exchange operations, is known in the art variously as a refueling, or transfer, canal. Typically, a transfer car is mounted on suitable tracks so as to travel the length of the refueling canal, the car thus passing through the transfer tube 30 and extending, as far as is necessary, into the fuel exchange locations 20 and 23. Typically, the transfer car carries a fuel container which is pivotally mounted so as to be upended to a vertical orientation while within the exchange locations 20 and 23 and then to be disposed horizontally for passage through the transfer tube 30.

The conventional design of nuclear systems, and particularly the provision of the containment structure 12 and the separate fuel storage and handling building 22, interconnected by transfer tube 30, presents various problems in designing an effective transfer system. For example, the transfer system necessarily must be interrupted at the ends of the transfer tube 30 to accommodate closure of the valves 31 and 32, as is required for normal operation of the reactor. A further problem in the design of such transfer systems is the desire to keep as much equipment out of the containment structure 12 as possible and, particularly, to avoid the use of drive mechanisms in both the containment structure 12 and the fuel storage and handling building 22; preferably, a transfer system should employ only a single drive mechanism, located in the fuel storage and handling building 22. Accordingly, most transfer systems in use today utilize a long pusher arm which extends from a single drive system positioned in the fuel storage and handling building 22 and which engages the transfer car, so as to advance same through the transfer tube 30 and into the fuel exchange location 20, at which the fuel container is upended, as before noted. The use of the elongated pusher arm, however, undesirably extends the length of the refueling canal within the fuel storage and handling building 22, so as to accommodate both the pusher arm and the length of the transfer car when retracted into the fuel storage and handling building 22 -- sufficiently, moreover, to permit closure of the valve 32. The extension of the refueling canal within the fuel storage and handling building 22 not only increases the cost of the structure itself but as well imposes the requirement for storing a larger quantity of boron-charged water, introducing yet further expense.

Accordingly, prior art transport mechanisms have not been altogether satisfactory and thus there has been a continuing need for a more efficient and compact fuel transfer system.

SUMMARY OF THE INVENTION

The fuel transfer system of the present invention overcomes the deficiencies of prior art transfer systems, accommodating the spacing requirement to permit valve closures at the ends of the transfer tube, while employing a drive mechanism which is located solely within the fuel storage and handling building, and thus not within the containment structure, is compact in size, and is easily, remotely operable. Particularly, the fuel transfer system of the invention utilizes a segmented drive screw comprising first, second and third, axially aligned drive screw segments located respectively in the fuel storage and handling building, the transfer tube, and in containment, and which normally are spaced apart at their corresponding ends to define gaps, to permit closure of the valves at the ends of the transfer tube. The third screw segment within the containment structure is mounted for rotation in a fixed axial position, whereas each of the first and second drive screw segments is rotatably mounted both for rotation and for linear travel, the second segment within the transfer tube being normally spring biased to a central position in which the ends thereof are displaced inwardly from the corresponding ends of the transfer tube. A remotely controlled linear drive mechanism provided within the storage and handling building engages the corresponding, first drive screw segment to advance same axially so as to engage the mating end of the second drive screw segment and jointly advance same, ultimately to engage the mating ends of the second and third segments, the mating ends, when so engaged, locking the segments together for common rotation. A remotely controlled rotary drive mechanism within the storage and handling building simultaneously rotates the first segment as it is linearly advanced so as to produce the mating engagement with the second segment and, likewise, commonly rotates the engaged first and second segments to bring the mating ends of the second and third segments together and thus drive the third segment in rotation as well. A segmented track includes corresponding first, second and third track segments fixedly mounted within the storage and handling building, the transfer tube, and the containment structure, respectively, the segments being similarly spaced apart to define gaps at the ends of the transfer tube to accommodate the closure valves. A transfer car is received on the segmented track and carries a fuel assembly container which is pivotally mounted thereon for being automatically upended to a vertical position within each of the exchange locations and automatically returned to a horizontal position for passage through the transfer tube. A drive nut fixed to the car engages the segmented drive screw such that in rotation of the latter, the transfer car may be moved from one fuel exchange location to the other, through the transfer tube, in performing the fuel exchange operations.

The system of the invention thus satisfies the criteria of avoiding the requirement for any power driven system within the containment structure, while not imposing any requirement for enlargement of the fuel storage and handling building to house the remote drive mechanisms. Moreover, the system accommodates the valve closure requirements relative to the transfer tube, while providing positive and precise, driven control of the transfer car.

These and other advantages of the fuel transfer system of the present invention will become more apparent from the following detailed description and accompanying drawings.

DETAILED DESCRIPTION OF THE PREFERRED EMBODIMENTS

Figure 1:
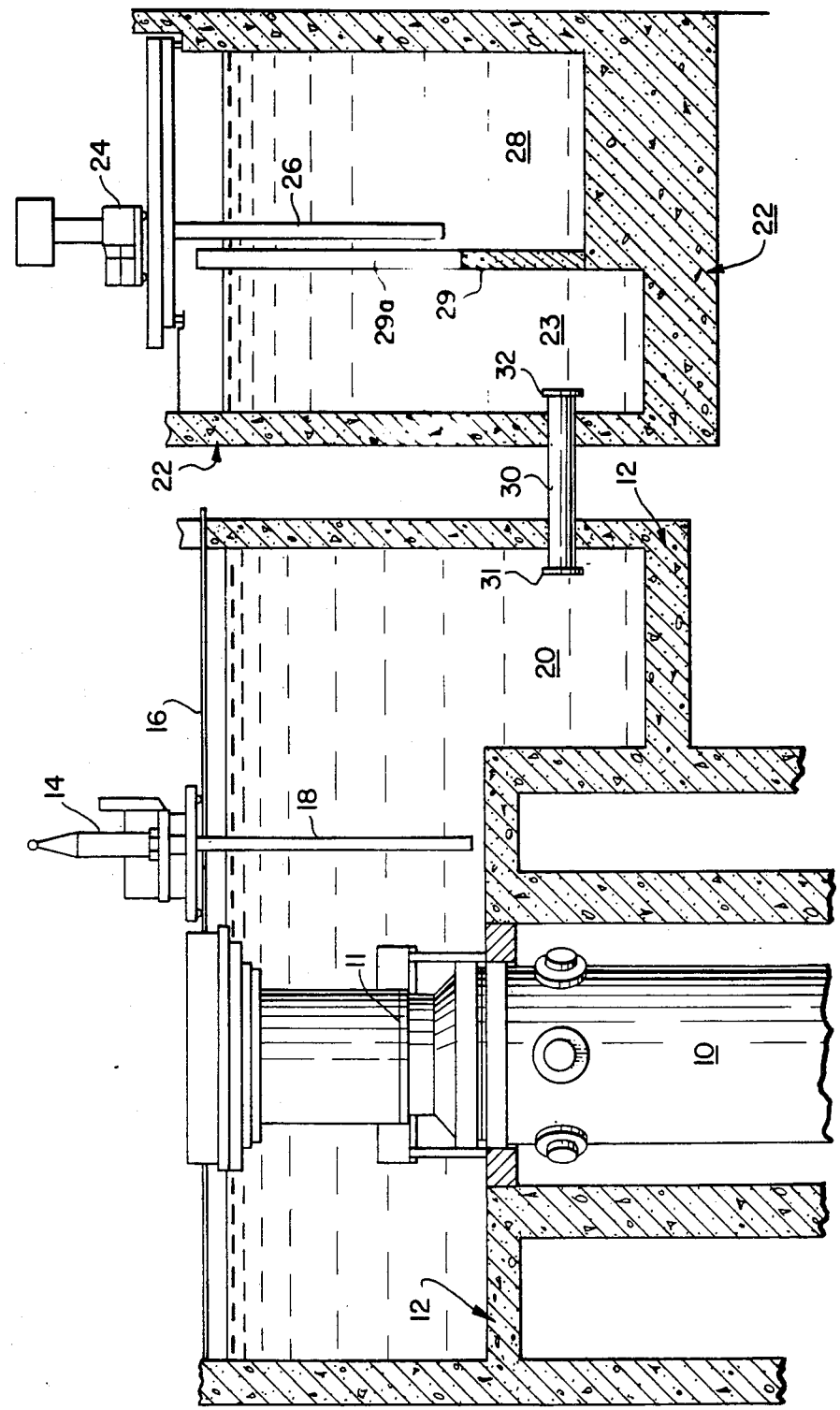
FIG. 1 is a plan view, partly in cross-section, of a nuclear reactor installation including a containment structure housing a nuclear reactor and a fuel storage and handling building interconnected by a transfer tube and illustrative transport apparatus for transporting fuel therebetween.
Figure 2:
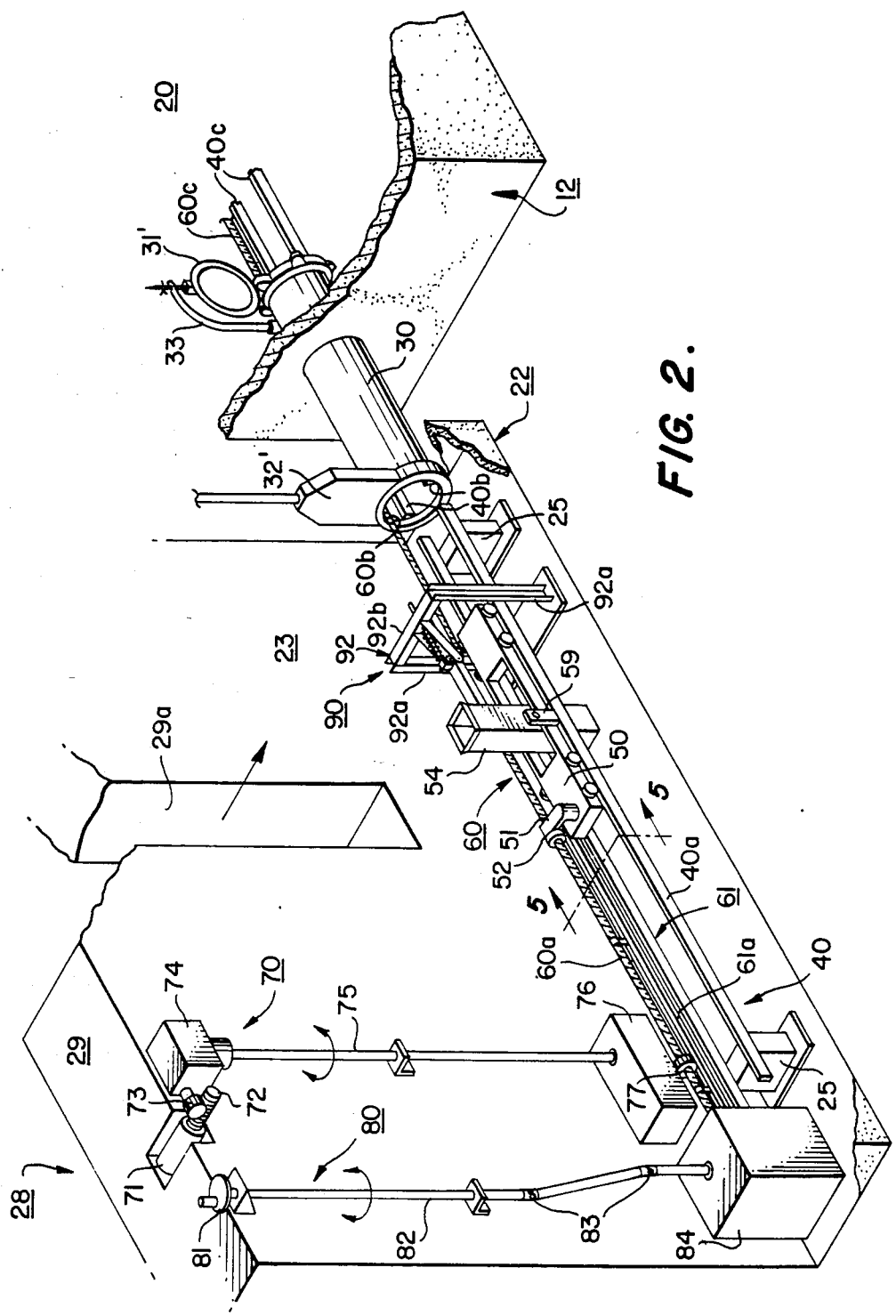
FIG. 2 is perspective, simplified view of the fuel transfer system of the present invention, illustrating respective components thereof as provided within the fuel storage and handling building, the transfer tube, and the containment sructure for a nuclear reactor.

FIG. 2 is a schematic, simplified perspective view of the remotely operable fuel transfer system of the invention, illustrating its general organization as incorporated in a conventional nuclear reactor installation of the type illustrated in FIG. 1. Thus, utilizing the same reference numerals to denote corresponding elements as in FIG. 1, there is illustrated in FIG. 2 a transfer tube 30 extending between fuel exchange locations 20 and 23, respectively, within a containment structure 12 and a fuel storage and handling building 22. Valves 31' and 32', respectively, within the exchange locations 20 and 23 serve to close the corresponding ends 31 and 32 of the transfer tube 30 and, as schematically illustrated, are remotely operable to open positions to enable fuel transfer, or exchange, operations. While not critical, the valve 31' is illustrated to be a hatch-type valve which is mounted on a suitable bracket to permit it to be remotely operated to an open position in which it is raised vertically out of the way of the tube; similarly, valve 32' is illustrated as a gate-type valve which may be raised or lowered to open or close the corresponding end of the transfer tube 30.

A segmented track system 40 includes segments 40a, 40b and 40c located respectively within the fuel storage and handling building 22, the transfer tube 30, and the containment structure 12. A transfer car 50, on which a fuel container 54 is pivotally mounted, is adapted to ride on the track system 40 to transport fuel rod assemblies between the exchange locations 20 and 23. An upending mechanism 90 operates to automatically pivot the container to an upended or upright position at a location in alignment with a passageway 29a which extends through the partition 29 separating the exchange location 23 from a storage and handling location or fuel pit 28 within the fuel storage and handling building 22. The transfer car 50 is driven by a segmented screw drive 60 having screw segments 60a, 60b and 60c fixedly mounted within the fuel storage and handling building 22, the transfer tube 30, and the containment structure 12, respectively. As illustrated in FIG. 2, the individual segments 60a, 60b and 60c have their respective ends interlocked in mating engagement, as later detailed, so as to afford a unitary segmented drive screw 60. The car 50 is connected by a bracket 51 to a follower 52 received on the drive screw 60 so as to be driven laterally between the exchange locations 20 and 23 depending upon the direction of rotation of the drive screw 60.

A remote rotary drive mechanism 70 includes a motor 71 which operates through drive gears 72 and 73 and a gear box 74 to drive a shaft 75 selectively in clockwise or counterclockwise directions. Shaft 75 in turn drives a gear box 76 which in turn drives a sliding drive gear 77, which is secured to the first drive screw segment 60a for driving same in rotation.

A remotely controlled linear drive mechanism 80 includes a rotary power drive source 81 which, while illustrated as a simple hand wheel, may instead be a motor, for in turn driving shaft 82 which in turn actuates a linear position control mechanism 84. The mechanism 84 engages the first drive screw segment 60a to move same in a forward or reverse axial direction, respectively, for assembling the drive screw segments 60a, 60b and 60c to initiate a fuel exchange operation or for separating same at the conclusion of a fuel exchange operation, in a manner to be more fully described. For the contemplated, specific type of linear postion control mechanism 84 later detailed, it is desirable to include universal joints 83 in the shaft 82 to accommodate any offset or nonalignment condition which may exist.

FIG. 2 also schematically illustrates an upending mechanism 90 associated with the fuel exchange locatioh 23 within the fuel storage and handling building 22 for automatically upending the fuel assembly container 54 to its vertical position, as there illustrated, as the car 50 is driven into the exchange location 23 and reaches a position aligned with passageway 29a, as before described. A corresponding upending mechanism (not shown) is provided in the exchange location 20 within the fuel containment structure 12 for performing this identical function.

Figure 3:
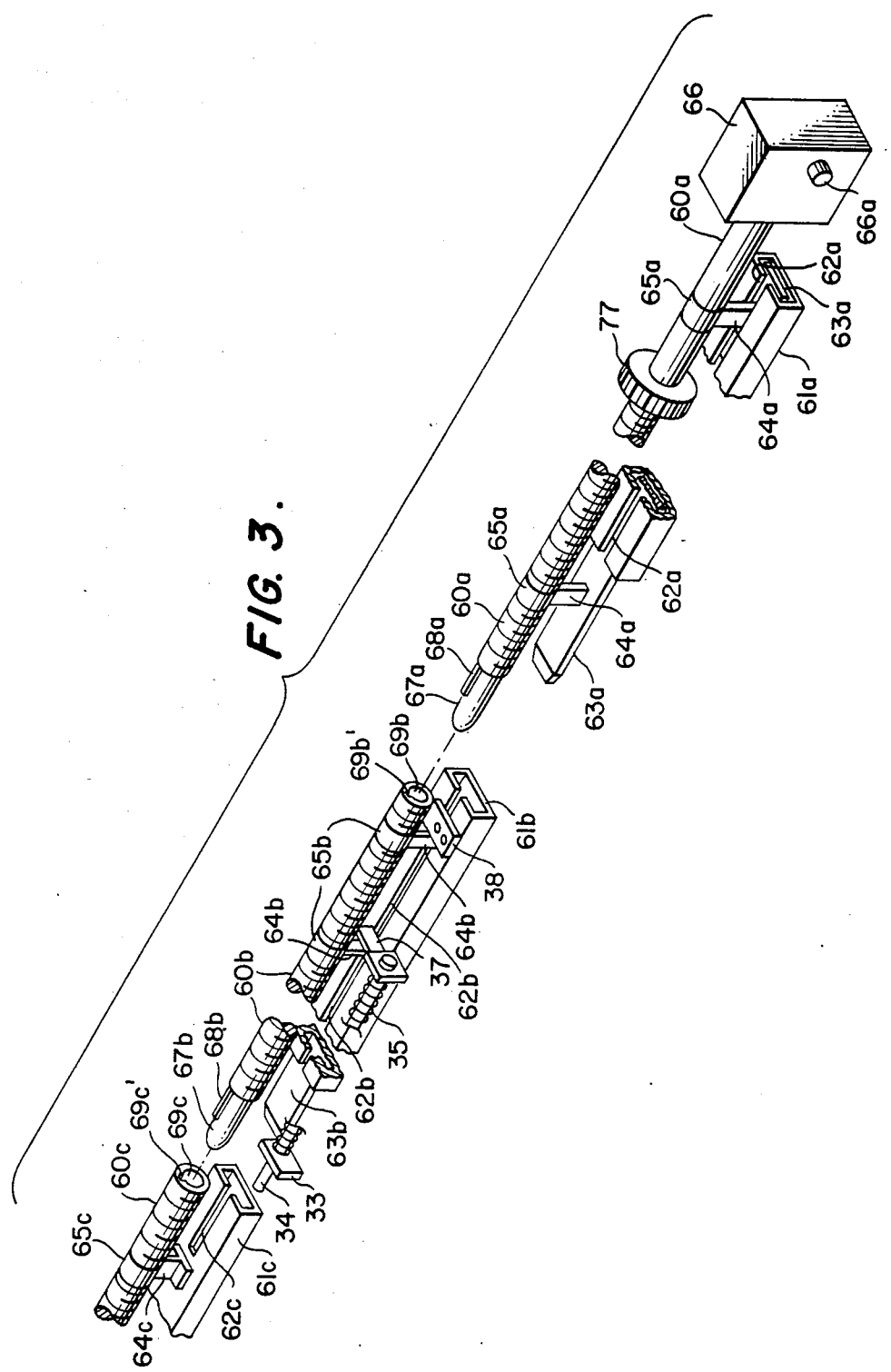
FIG. 3 is an enlarged perspective view of the segmented drive screw with associated mounting elements and a rotary drive mechanism therefor.

The segmented drive screw 60 and associated supporting apparatus therefor is shown in more detail in the perspective view of FIG. 3, in which various elements are broken away and other elements, as appear in FIG. 2, are deleted to enable clarity of illustration. As will be seen, the drive screw segments 60a, 60b and 60c are mounted in somewhat similar fashion, all thereof being rotatably mounted so as to be driven in rotation; the first and second drive screw segments 60a and 60b further are mounted for linear or translational movement in a direction parallel to the common, aligned axes of all three segments. Particularly, there is provided a segmented support channel 61 comprising segments 61a, 61b and 61c, each of generally rectangular, hollow cross-section, the channel segments 61a and 61b respectively including open slots 62a and 62b throughout the length of their upper surfaces. Channel segment 61c has no requirement for the open slot but likewise is of open, or hollow, rectangular cross-section for at least a portion of its length, for a reason to be explained. Sliding support bars 63a and 63b of elongated form and horizontal cross-section are received within the interior channels of the support channel segments 61a and 61b and are free to slide therewithin. Vertical standoff elements, or brackets, 64a and 64b having rotary mounting rings 65a and 65b thereon, which receive and rotatably support the corresponding drive screw segments 60a and 60b, are secured to the corresponding support bars 63a and 63b and extend through the corresponding, open slots 62a and 62b.

The first drive screw segment 60a is rotatably mounted at its first end in conventional fashion (not shown) to a drive block 66 which is secured, illustratively by a pair of pins 66a (only one of which is seen in FIG. 3), to the linear position control mechanism 84 of FIG. 2, for laterally, or axially, moving the first drive screw segment 60a, as afforded by the sliding support afforded by the associated support channel segment 61a and sliding support bar 63a. It will be understood, of course, that the channel segment 61a is fixedly secured by brackets 25 within the fuel storage and handling building 22 (FIG. 2). The second drive screw segment 60b, as will be recalled, is mounted within the transfer tube 30, which has been omitted in the simplified perspective view of FIG. 3 to permit clarity of illustration; the corresponding, second support channel segment 61b, however, is rigidly secured to the interior sidewall of the transfer tube 30 (see FIG. 2). The second drive screw segment 60b likewise is rotatably supported by rings 65b and mounted for lateral movement by corresponding vertical offsets or brackets 64b which are connected through slot 62b to the sliding support bar segment 63b within the support channel segment 61b. Segment 60b, however is biased to a normal position against stop 38, in which it is disposed toward the drive end of the screw within the transfer tube 30 with its opposite end displaced inwardly from the opposite end of the transfer tube 30. The biasing is accomplished by a conventional spring bias arrangement comprising a block 33 which is fixedly mounted within the tube 30, a bracket 37 secured to one of the vertical offset brackets 64b, a guide rod 34 which is carried by the bracket 37 and extends through a suitable aperture in the bracket 33, and a coil spring 35. Further, a block 38 is affixed to the support channel segment 61b which acts as a stop to limit the travel of the screw segment 60b under the biasing force of the coil spring 35, and establishes the normal position of the second drive screw segment 60b within the transfer tube 30.

The third drive screw segment 60c, which is provided within the exchange location 20 of the containment structure 12, is rotatably supported by one or more rings 65c connected through corresponding vertical standoffs or brackets 64c to the support channel segment 61c which in turn is fixedly mounted within the containment structure 12. Segment 60c thus is free to rotate but is maintained in a fixed axial position.

The drive screw segments 60a, 60b and 60c are shown in FIG. 3 in their normal, axially aligned positions, displaced with a gap therebetween so as to permit operation of the valves 31' and 32', as discussed earlier with reference to FIGS. 1 and 2. As seen in FIG. 3, the respectively associated, displaced ends of the first and second segments 60a and 60b, and of the second and third segments 60b and 60c are configured to have a mating relationship. Particularly, the segments 60a and 60b respectively carry tapered pins 67a and 67b having keys 68a and 68b thereon. Further, the second and third segments 60b and 60c have corresponding, mating receiving bores 69b and 69c and associated keyways 69b' and 69c' for receiving the respective, tapered pins 67a and 67b and associated keys 68a and 68b.

To facilitate the advancement and mating engagement of the segments of the screw drive 60, friction clutchs are incorporated within the rotary mounting rings 65b and 65c for the second and third segments 60b and 60c, respectively. Once the associated valves 30' and 31' are open, the linear drive mechanism 80 (FIG. 2) is actuated to advance the drive block 66 and in turn advance the first drive screw segment 60a. During the advance and engagement operation, the rotary drive mechanism 70 (FIG. 2) is operated slowly so as to rotate gear 77 and in turn the first drive screw segment 60a (FIG. 3) at a slow rate. The tapered pin 67a thus advances into the receiving bore 69b of the second segment 60b and the key 68a then drags on the face of the second screw segment 60b, the latter restrained from rotation by the friction clutch before noted, until key 68a is received in the corresponding keyway 69b'. The first segment 60b is moved continuously in the linear, or axial, direction until the two segments 60a and 60b are fully engaged, at which time continued forward motion of the drive block 66 commonly advances segments 60a and 60b thereby, in succession, to engage the mating ends of the second and third segments 60b and 60c in like manner. As readily seen in FIG. 3, the forward ends of the sliding support bars 63a and 63b advance into the hollow channels 61b and 61c, respectively, in conjunction with the assembly of the screw drive segments 60a, 60b and 60c, and preferably are tapered to facilitate that function. Although not shown, the third segment 60c is resiliently biased to a normal axial position by a mechanism which may be similar to that employed with the second segment 60b, rather than being fixedly mounted as shown, so as to facilitate the drag function and the engagement of the key 68b in the keyway 69c'. Due to the keyway mating arrangement, the assembled segments 60a, 60b and 60c provides a continuous, albeit segmented screw drive 60 which extends from the exchange location 23 of the storage and handling building 22 to the exchange location 20 of the containment structure 12.

Figure 4:
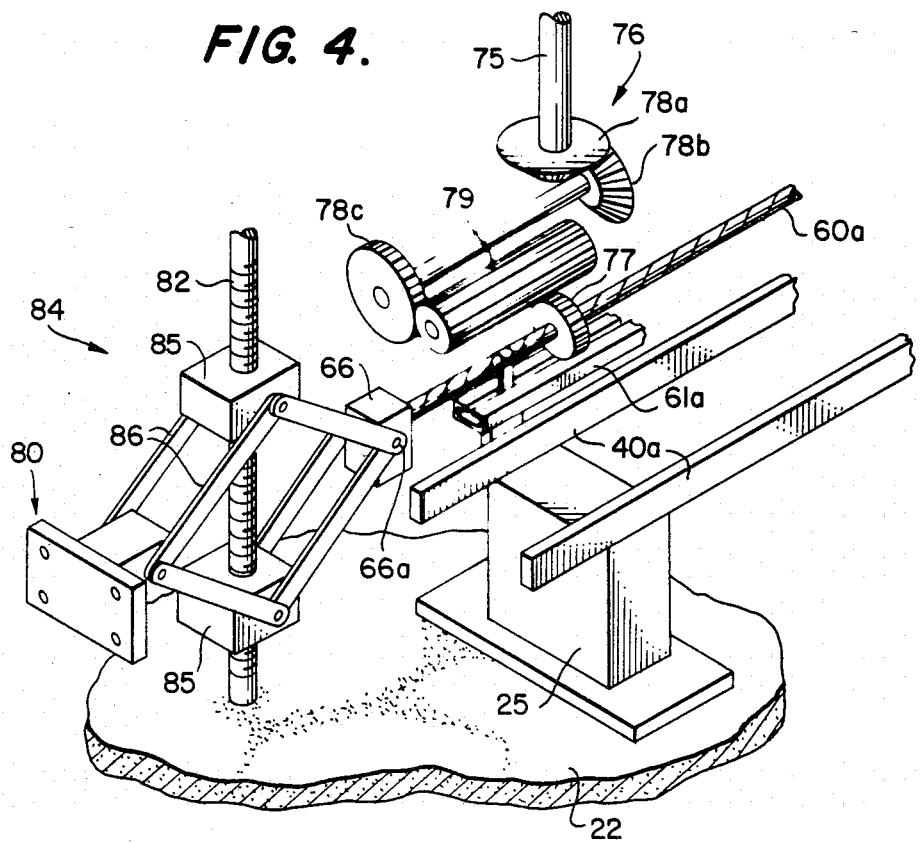
FIG. 4 is an enlarged and detailed, perspective view of components of the rotary drive mechanism and a linear drive mechanism for the segmented drive screw of the invention, as more generally illustrated in FIG. 2.

FIG. 4 is a detailed perspective view of the gear box 76 and the linear position control mechanism 84 of FIG. 2. Rotary power from shaft 75 conveniently is transferred through a pair of mating bevel gears 78a and 78b and a driving gear 78c to a sliding drive joint 79 which may comprise a spline shaft or a gear on a long pinion, which in turn engages the gear 77 coupled to the drive screw segment 60a, as before described. The linear position control mechanism 84, as shown in FIG. 4, may have a configuration similar to a scissors jack. Thus, the lower end of the shaft 82 is threaded and carries thereon threaded blocks 85 which in conventional fashion are drawn closer together or spaced further apart by corresponding, opposite directions of rotation of the shaft 82, and in turn actuate the pivotally interconnected links 86 to advance or retract drive block 66, and thus the associated segmented drive screw 60, in the advancing or retracting axial directions, as before described with reference to FIG. 3.

Figure 5:
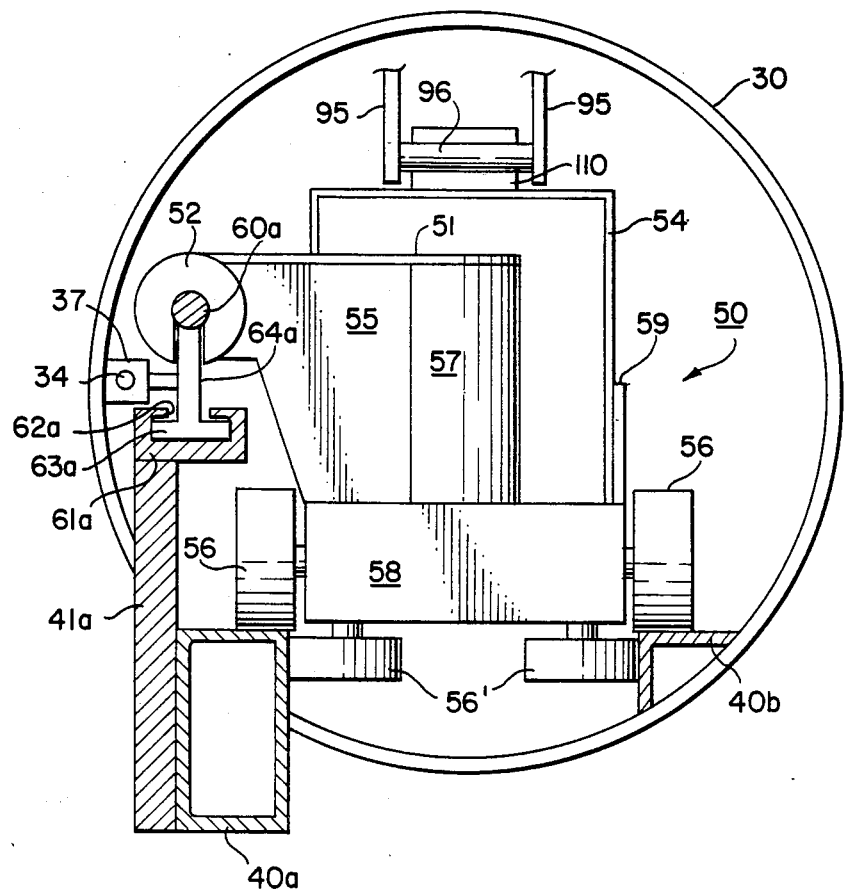
FIG. 5 is a cross-sectional view, taken along the line 5—5 in FIG. 2, illustrating the association of a transfer car with the segmented track and segmented drive screw system of the present invention.

FIG. 5 is a cross-sectional, elevational view taken along the line 5—5 in FIG. 2, for illustrating certain details of the segmented track 40 and the upending mechanism 90, both located within the fuel storage and handling building 22. The tracks may comprise parallel lengths of hollow channel stock, of rectangular cross-section, one length of which is shown at 40a in FIG. 5. The other channel of track 40a is not illustrated in FIG. 5, to permit illustrating the aligned segment 40b, which conveniently may comprise an L-shaped right angle piece of bar stock which is secured directly to the interior of the transfer tube 30, in alignment with the channel 40a forming the right hand track (not shown) in the orientation of FIG. 5. A vertical beam 41a is secured to the channel stock comprising the track segment 40a illustrated in FIG. 5 and supports on its upper edge the support channel segment 61a on which the sliding support bar 63a is received. The vertical bracket 64a extending through slot 62a is also readily seen in FIG. 5.

The transfer car 50 is supported on the segmented track 40 by a plurality of generally vertically oriented wheels 56 and two or more pairs of horizontally oriented wheels 56' which engage the interior, or facing, vertical surfaces of the segmented track 40 to provide lateral support, the wheels 56 and 56' of course being rotatably mounted to the frame 58. Follower 52 is internally threaded, and may comprise a roller type nut or a screw thread type nut, so as to be engaged on the segmented drive screw 60, shown particulary for segment 60a in FIG. 5. The follower 52 is split to permit it to pass over the vertical standoffs, e.g., standoff 64a seen in FIG. 5, bracket 51 further including horizontal and vertical supports 55 and 57 connected to the frame 58.

Typically, the car 50 is maintained in the storage and handling building 22, when not in use. Thus, drive nut 52 normally remains engaged on the first drive screw segment 60a. It further will be apparent that, as the linear drive mechanism 84 is advanced during the initial engagement of the drive screw segments 60a, 60b and 60c, the car 50 correspondingly is advanced linearly by the linear movement of segment 60a in addition to being advanced laterally by the slow rotation of the first drive segment 60a. That condition continues until all three segments 60a, 60b and 60c are interengaged. Thereafter, the rotary drive mechanism 70 may be adjusted to increase the rate of rotation of the segmented screw drive 60 to permit corresponding, more rapid lateral movement of the car 50.

While the fuel container 54 is illustrated in a vertical position in FIG. 2, as before noted, it is automatically shifted to a horizontal position for passing through the transfer tube 30, both in travelling from the fuel exchange location 23 to the exchange location 20, and in the reverse direction of travel as well. This is performed by the upending mechanism 90 of FIG. 2, shown in further detail in the enlarged perspective view of FIG. 6, relevant portions thereof as well appearing in FIG. 5. As before noted, a corresponding upending mechanism is provided in the exchange location 20 within the fuel storage and handling building 12, but is not shown since it may be substantially identical, as later detailed.

More particularly, the upending mechanism 90 includes a supporting frame 92 having vertical supports 92a and a horizontal cross bar 92b. (See FIG. 6.) A U-shaped bracket 94 is secured rigidly to the horizontal cross bar 92b, depending angularly downwardly therefrom, relative to the horizontal. Parallel, spaced L-shaped brackets 95 are pivotally mounted to the lower extremities of the side arms of the U-shaped bracket 94 and a pin 96 (FIGS. 5 and 6) extends between the extremities of the longer legs of the L-shaped brackets 95 (see FIG. 5). A rod 97 extends through an enlarged aperture 98 in the horizontal cross bar 92b, which permits a degree of pivotally upward and downward movement of the rod 97 therein, the opposite end of rod 97 being secured within block 99 which in turn is pivotally connected to the shorter legs of the L-shaped brackets 95. Coil spring 100 is received over the rod 97 and maintained under compression.

The upper sidewall of the fuel container 54, when horizontally disposed as shown in FIG. 5, includes a generally U-shaped bracket 110, having a throat which is parallel to that same upper sidewall of the fuel container 54 as above defined and which faces the upending mechanism 90 as the car 50 approaches same when passing from the transfer tube 30 into the exchange location 23. It will be understood, for the orientation of the elements illustrated in FIG. 5, that the L-shaped brackets 95 normally are rotated, by the force of coil spring 100 acting on block 99, about the pivotal connection to the U-shaped supporting bracket 94, to position the longer legs thereof against a stop in a generally vertical orientation. The U-shaped bracket 110 thus engages the pin 96 as the car 50 is transported past the upending mechanism 90. As the car continues to move, the lower ends of brackets 95 are rotated upwardly, correspondingly rotating the container 54 to an upright position and compressing the spring 100. In the reverse movement of the car 50, the compression of spring 100 acts against block 99 to rotate the L-shaped bracket 95 downwardly, permitting the container 54 as well to pivot downwardly to a horizontal position and returning the longer legs of the L-shaped brackets 95 to their normally vertical positions, in preparation for a subsequent upending operation.

Figure 6:
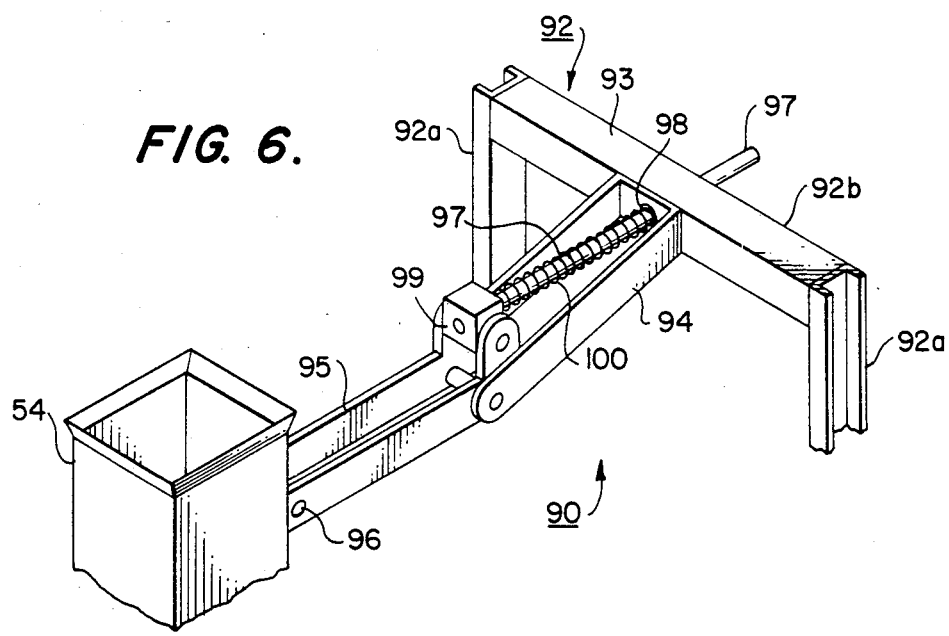
FIG. 6 is an enlarged, perspective view of an upending mechanism for a fuel container carried by a transfer car, as seen more generally in FIG. 2.

While the basic construction of an upending mechanism for use in the containment structure 12 may be similar, as before noted, to the upending mechanism 90 employed in the exchange location 22, it will be apparent that certain reversals of parts will be necessary. Particularly, a bracket identical to the bracket 110 is mounted on the opposite, parallel surface of the container 54 with the open throat thereof facing in the opposite direction so that it can correspondingly engage a pin such as the pin 96 of an upending mechanism which would be substantially identical to the upending mechanism 92 as shown in FIG. 6, but positioned beneath the track segment 40c in the containment structure 12. It is apparent of course that the container 54, as rotated into a vertical position as seen in FIG. 2, is open at the upper end and necessarily closed at the bottom end. The container moreover is rotated from a horizontal position in passing from the transfer tube 30 into the exchange location 23, in a counter clockwise direction for pivoting to the upright position as seen in FIG. 2. In the exchange location 20 of the containment structure 12, the container necessarily must rotate in that same counterclockwise direction, as viewed in FIG. 2, such that the open end is rotated to the upper position in the vertical orientation of the container 54. With reference to FIG. 6, therefore, if the same were rotated 180° (i.e., viewed in an upside down position) and if the open end of the container 54 as illustrated therein were instead the closed end, it will be apparent that the identical mechanism of FIG. 6 would function to achieve the appropriate direction of rotation, or pivoting, of the container 54, when employed in the exchange location 20 as described, to fulfill the required upending operation.

From the foregoing, it will be appreciated that the fuel transfer system of the present invention affords numerous advantages over prior art fuel transfer systems, including particularly the push rod type of prior art system. In the system of the invention, all power source devices, whether manual or motor driven, are disposed above the level of the boron-charged water and provide for remote actuation of the mechanical transfer system itself. Of great significance, the segmented and remotely connectable drive system of the invention occupies a minimum of space within the fuel storage and handling building. Indeed, the extent of travel of the screw drive segments need only be sufficient to close the gaps necessarily afforded therebetween to enable closure of the valves at the ends of the transfer tube.

Numerous modifications and adaptations of the system of the present invention will readily be apparent to those of skill in the art and thus it is intended by the appended claims to cover all such modifications and adaptations as fall within the true spirit and scope of the invention.

What is claimed is:

1. A fuel transfer system for transferring fuel assemblies through a transfer tube extending between, and having respective ends thereof disposed in, corresponding fuel assembly exchange locations of a fuel storage and handling building and a containment structure for a nuclear reactor, wherein corresponding valves disposed at said ends of said transfer tube are remotely, selectively operable to a closed position for sealing same during normal operation of the reactor and to an open position to permit transfer of fuel therethrough during fuel exchange operations, comprising:

a segmented track comprising first, second and third track segments supported in aligned relationship at fixed positions respectively in said fuel storage and handling building, said transfer tube, and said containment structure;

transport means for receiving at least one fuel assembly, said transport means being supported on said segmented track and moveable therealong for transporting a received fuel assembly between said fuel exchange locations;

a segmented drive screw comprising first, second and third drive screw segments associated respectively with said fuel storage and handling building, said transfer tube, and said containment structure;

first, second and third mounting means within said fuel storage and handling building, said transfer tube, and said containment structure, respectively, for rotatably mounting said respective first, second and third drive screw segments in axially aligned relationship and normally displaced from one another to define gaps between the adjacent ones of said first and second drive screw segments and said second and third drive screw segments at positions respectively corresponding to the ends of said transfer tube for accommodating closure of said valves at said ends of said transfer tube;

each of said first and second mounting means permitting linear movement of said corresponding first and second drive screw segments along said aligned axes thereof;

first corresponding mating engagement means on the respective, adjacent ends of said first and second drive screw segments and second corresponding mating engagement means on the respective, adjacent ends of said second and third drive screw segments;

rotary drive means for rotating said first drive screw segment selectively in clockwise and counterclockwise directions about said aligned axis thereof;

linear drive means for selectively, linearly moving said first drive screw segment toward said second drive screw segment to bring said corresponding mating engagement means of said first and second drive screw segments into engagement and, in succession, to linearly move said engaged first and second drive screw segments toward said third drive screw segment to bring said corresponding mating engagement means of said second and third drive screw segments into engagement, said first, second and third drive screw segments thereby being interengaged for common rotation;

follower means received in threaded relationship on said segmented drive screw and moveable linearly therealong in first and second, opposite axial directions in accordance with the respective clockwise and counterclockwise directions of rotation thereof; and means connecting said follower means to said fuel transport means for correspondingly moving said fuel transport means along said segmented track selectively from one of said fuel exchange locations and through said transfer tube to the other of said fuel exchange locations.

2. A transfer system as recited in claim 1, wherein:

said second mounting means includes resilient biasing means for exerting a force normally maintaining said second drive screw segment at a normal position within said transfer tube with said ends thereof displaced inwardly of the corresponding ends of said transfer tube; and said linear drive means moves said first drive screw segment into engagement with said second drive screw segment, and moves said second drive screw segment, as engaged with said first drive screw segment, into engagement with said third drive screw segment, against the force of said resilient biasing means.

3. A transfer system as recited in claim 2, wherein:

said transport means comprises a fuel assembly container for receiving a fuel assembly therewithin and means for pivotally mounting said fuel assembly container for movement between horizontal and vertical orientations, relative to a horizontal orientation of said segmented track, and there is further provided:

upending means in said respective fuel exchange locations of said fuel storage and handling building and said containment structure, each said upending means engaging said pivotally mounted fuel assembly container for upending same to a vertical position during movement of said transfer means from said transfer tube to each of said fuel exchange locations, and for returning said fuel assembly container to a horizontal position during movement of said transport means from said transfer tube to each of said fuel exchange locations toward said transfer tube, thereby to automatically dispose said fuel assembly container in a horizontal orientation during movement of said transport means through said transfer tube and to automatically upend said fuel container to a vertical orientation in each of said fuel exchange locations.

4. A transfer system as recited in claim 1, wherein each of said second and third mounting means further includes means for restraining rotation of the corresponding said second and third drive screw segments during engagement of the respective, corresponding mating engagement means of said first and second drive screw segments and of said second and third drive screw segments.

5. A transfer system as recited in claim 1, wherein:

each of said first and second mounting means comprises a hollow, elongated channel corresponding in length substantially to that of the respective first and second drive screw segments and extending in parallel axial relationship therewith and respective first and second elongated support bars slidingly received in said respective first and second hollow channels and first and second standoff means respectively associated with said first and second elongated support bars for rotatably supporting said respective first and second drive screw segments, said longitudinal hollow support channels being aligned;

said third support means includes a hollow channel portion aligned with said first and second hollow support channels; and said second hollow support channel receiving a portion of said first longitudinal support bar and said third hollow support channel receiving a portion of said second longitudinal support bar, in succession, and in correspondence with said first drive screw segment being brought toward and into engagement with said second drive screw segment and said second drive screw segment being moved toward and brought into engagement with said third drive screw segment, respectively.

6. A transfer system as recited in claim 5, wherein said linear drive means is rotatably connected to the end of said first drive screw segment opposite to the end thereof adjacent said second drive screw segment.

7. A transfer system as recited in claim 1, wherein said rotary drive means comprises:

an elongated spline mounted in parallel axial relationship relative to said first drive screw segment and of a length corresponding to the extent of linear movement of said first drive screw segment for bringing said first and second and said second and third drive screw segments, respectively, into engagement;

a gear secured to said first drive screw segment in coaxial relationship therewith and engaging said elongated spline; and means for rotating said spline about the axis thereof selectively in first and second opposite directions.

8. A transfer system as recited in claim 1, wherein:

said first, second and third mounting means comprise plural standoff elements having means rotatably supporting said respectively corresponding first, second and third drive screw segments;

said follower means comprises a split nut received in threaded engagement on said segmented drive screw, the split therein being of a size and position so as to accommodate said standoff elements as said split nut moves laterally along the length of said segmented drive screw during rotation of the latter.

9. A transfer system as recited in claim 1, wherein each of said first and second corresponding mating engagement means comprises:

an axially aligned, tapered pin of reduced diameter relative to the diameter of said segmented drive screw having a linearly extending key thereon, on one of said adjacent ends of said first and second, and of said second and third drive screw segments; and a mating, cylindrical, coaxial recess and longitudinal keyway extending within the interior of the other of said adjacent ends of said first and second, and of said second and third drive screw segments.

10. A remotely controlled transfer system for tranferring an element through a transfer canal extending between at least first and second locations, wherein means at a predetermined position intermediate said first and second locations are selectively operable for blocking said transport canal to isolate said locations, comprising:

a segmented track comprising at least first and second segments supported in aligned relationship at fixed positions respectively in said first and second locations;

transport means for receiving an element to be transferred, said transport means being supported on said segmented track and moveable therealong for transporting a received said element along said transport canal, selectively from one to the other of said first and second locations;

a segmented drive screw comprising first and second drive screw segments associated respectively with said first and second locations, respectively;

first and second mounting means within said first and second locations, respectively, for rotatably mounting said respective first and second drive screw segments in axially aligned relationship and normally displaced from one another to define a gap at said predetermined position in said transport canal for accommodating said selectively operable blocking means, at least said first mounting means permitting linear movement of said corresponding first drive screw segment along said aligned axes;

mating engagement means on respective, adjacent ends of said first and second drive screw segments;

rotary drive means for rotating said first drive screw segment selectively in clockwise and counterclockwise directions about said aligned axes;

linear drive means for selectively, linearly moving said first drive screw segment toward said second drive screw segment for engaging said mating engagement means of said first and second drive screw segments and thereby interengaging said first and second drive segments for common rotation;

follower means received in threaded relationship on and moveable linearly along said interengaged, first and second drive screw segments in first and second, opposite axial directions in accordance with the respective clockwise and counterclockwise directions of rotation thereof; and means connecting said follower means to said transport means for correspondingly moving said transport means along said segmented track for selectively transporting an element from one to the other of said first and second exchange locations.

11. A transfer system as recited in claim 10, wherein:
said second mounting means includes resilient biasing means for exerting a force which normally maintains said second drive screw segment at a predetermined position relative to said first and second locations at which said end thereof having mating engagement means thereon is displaced from said predetermined blocking position; and said linear drive means moves said first drive screw segment across said gap and into engagement with said second drive screw segment against the force of said resilient biasing means.

12. A transfer system as recited in claim 11, wherein said second mounting means further comprises means for restraining rotation of said second drive screw segment during engagement of said mating engagement means of said first and second drive screw segments.

13. A transfer system as recited in claim 11, wherein said mating engagement means comprise:
an axially aligned, tapered pin of reduced diameter, relative to the diameter of said segmented drive screw, said pin having a linearly extending key thereon, forming said adjacent end of one of said first and second drive screw segments; and a cylindrical, coaxial recess having a longitudinal keyway therein, extending within the interior of said adjacent end of the other of said first and second drive screw segments, for receiving said pin and key.

14. A method for transferring fuel assemblies through a transfer tube extending between, and having respective ends thereof disposed in, corresponding fuel exchange locations of a fuel storage and handling building and a containment structure for a nuclear reactor, wherein corresponding valves disposed at said ends of said transfer tube are remotely, selectively operable to a closed position for sealing same during normal operation of the reactor and to an open position to permit transfer of fuel assemblies therethrough during fuel exchange operations, comprising:

providing a segmented track comprising first, second and third track segments supported in aligned relationship at fixed positions respectively in said fuel storage and handling building, said transfer tube, and said containment structure;

providing transport means for receiving at least one fuel assembly, said transport means being supported on said segmented track and moveable therealong for transporting a received fuel assembly between said fuel exchange locations;

providing a segmented drive screw comprising first, second and third drive screw segments rotatably mounted in axial alignment respectively in said fuel storage and handling building, said transfer tube, and said containment structure with the respective, adjacent ends thereof normally displaced from one another to define gaps therebetween respectively corresponding to the ends of said transfer tube for accommodating closure of said valves at said ends of said transfer tube, each of said first and second drive screw segments being mounted to permit linear movement thereof along said aligned axes thereof;

providing follower means normally received in threaded relationship on said first drive screw segment and moveable linearly therealong in first and second, opposite axial directions in accordance with respective clockwise and counterclockwise directions of rotation thereof, said follower means being connected to said fuel transport means for correspondingly moving said fuel transport means along said segmented track;

initially rotating said first drive screw segment selectively in one of said clockwise and counterclockwise directions;

linearly moving said first drive screw segment, while initially rotating same, toward said second drive screw segment to bring said mating engagement means of said first and second drive screw segments into engagement and, in succession, to linearly move said second drive screw segment when engaged with said first drive screw segment toward said third drive screw segment to bring said mating engagement means of said second and third drive screw segments into engagement, thereby to interengage said first, second and third drive screw segments for common rotation; and further rotating said first drive screw segment selectively in one of said clockwise and counterclockwise directions thereby to move said follower means and correspondingly said fuel transport means from said fuel exchange location of said fuel storage and handling building and through said transfer tube to the fuel exchange location of said containment structure.

15. A method as recited in claim 14, further comprising:
performing the step of initially rotating said first drive screw segment at a slow rate of rotation while, simultaneously, linearly moving said first drive screw segment toward said second drive screw segment for interengaging said first, second and third drive screw segments for common rotation; and, thereafter,
performing the step of further selectively rotating said first drive screw segment at a higher rate of rotation for more rapidly moving said follower means and correspondingly said fuel assembly transport means along said segmented track.

16. A method as recited in claim 14, further comprising rotating said first drive screw segment and correspondingly said second and third drive screw segments, as interengaged therewith, in a second, opposite direction of rotation for moving said follower means and correspondingly said fuel assembly transport means from said second location and through said transfer tube to said first location.

17. A method as recited in claim 16, further comprising, upon completion of a fuel exchange operation:
selectively rotating said first drive screw segment and correspondingly said second and third drive screw segments interengaged therewith in the other of said clockwise and counterclockwise directions for moving said follower means and correspondingly said fuel assembly transport means into said exchange location of said fuel storage and handling building;
linearly moving said first drive screw segment into said exchange location of said fuel storage and handling building to disengage said first, second and third drive screw segments from one another; and
operating said valves to seal the ends of said transfer tube.

* * * * *